United States Patent
Dziekonski

(10) Patent No.: US 9,855,796 B2
(45) Date of Patent: *Jan. 2, 2018

(54) MODULAR AXLE SHAFT ASSEMBLIES FOR USE WITH RACING VEHICLES AND OTHER VEHICLES

(71) Applicant: Mitchell Z. Dziekonski, Stafford, TX (US)

(72) Inventor: Mitchell Z. Dziekonski, Stafford, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/395,297

(22) Filed: Dec. 30, 2016

(65) Prior Publication Data

US 2017/0106697 A1    Apr. 20, 2017

Related U.S. Application Data

(62) Division of application No. 13/681,853, filed on Nov. 20, 2012, now Pat. No. 9,533,531.

(51) Int. Cl.
*B60B 35/14*      (2006.01)
*B60B 35/04*      (2006.01)
(Continued)

(52) U.S. Cl.
CPC .............. *B60B 35/14* (2013.01); *B60B 27/06* (2013.01); *B60B 35/04* (2013.01); *B60B 35/121* (2013.01);
(Continued)

(58) Field of Classification Search
CPC ....... B60B 35/14; B60B 27/06; B60B 35/212; B60B 2900/313; B60B 2360/108; B60B 2360/102; B60B 2900/212; B60Y 2200/114

USPC ...................... 301/124.1, 125, 126, 131, 132
See application file for complete search history.

(56) References Cited

U.S. PATENT DOCUMENTS 2,667,047 A * 1/1954 Mennear ................. B60B 35/14
                                                               301/126
3,465,545 A * 9/1969 Stamm ................. B23K 20/129
                                                               228/114.5

(Continued)

FOREIGN PATENT DOCUMENTS

JP        2010189702       9/2010

OTHER PUBLICATIONS

NASA technical document "Fretting in Aircraft Turbine Engines" by Robert L. Johnson and Robert C. Bill (https://ntrs.nasa.gov/archive/nasa/casi.ntrs.nasa.gov/19740025115.pdf).

*Primary Examiner* — S. Joseph Morano
*Assistant Examiner* — Jean Charleston

(57) ABSTRACT

Axle shaft assemblies for use with a vehicle include a shaft formed from a first material having a first modulus of elasticity for providing the shaft with a flexibility adapted to withstand side impacts and resist deformation. A first end member can be engaged with a first end of the shaft, and a second end member can be engaged with the second end of the shaft. The end members can be formed from a second material having a second modulus of elasticity greater than the first, such that the end members are adapted to withstand a rotational force. The end members can include splined connectors, hub flanges, and other similar components. The resulting axle shaft assembly can thereby include modular combinations of materials having low and high moduli of elasticity.

17 Claims, 4 Drawing Sheets

(51) Int. Cl.
  *B60B 27/06*    (2006.01)
  *B60B 35/12*    (2006.01)
(52) U.S. Cl.
  CPC ... *B60B 2360/102* (2013.01); *B60B 2360/108* (2013.01); *B60B 2900/111* (2013.01); *B60B 2900/112* (2013.01); *B60B 2900/212* (2013.01); *B60B 2900/313* (2013.01); *B60Y 2200/114* (2013.01); *Y10T 29/49826* (2015.01)

(56) References Cited

U.S. PATENT DOCUMENTS

| | | | |
|---|---|---|---|
| 4,118,134 A * | 10/1978 | Mansel | B21K 25/00 29/432 |
| 4,135,766 A * | 1/1979 | Trautloff | B60B 35/14 301/114 |
| 5,213,250 A * | 5/1993 | Simon | B21K 1/063 228/114 |
| 6,059,378 A * | 5/2000 | Dougherty | B21K 25/00 301/124.1 |
| 6,065,813 A | 5/2000 | Fett et al. | |
| 6,254,196 B1 | 7/2001 | Gee | |
| 6,439,672 B1 | 8/2002 | Simon | |
| 6,926,371 B1 | 8/2005 | Gagnon | |
| 6,994,405 B2 | 2/2006 | Li et al. | |
| 7,229,137 B2 * | 6/2007 | Roberts | B60B 35/04 188/73.39 |
| 7,585,032 B2 | 9/2009 | Seeds et al. | |
| 7,938,222 B2 * | 5/2011 | Mikels | B60B 35/12 180/376 |
| 2006/0157950 A1 * | 7/2006 | Chalin | B60G 7/001 280/124.11 |

* cited by examiner

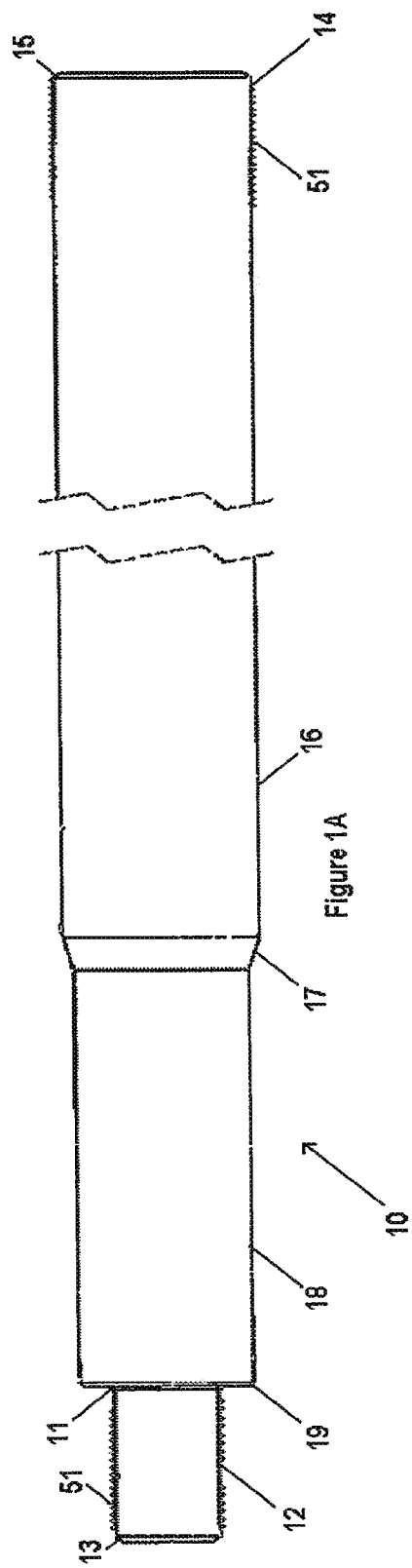
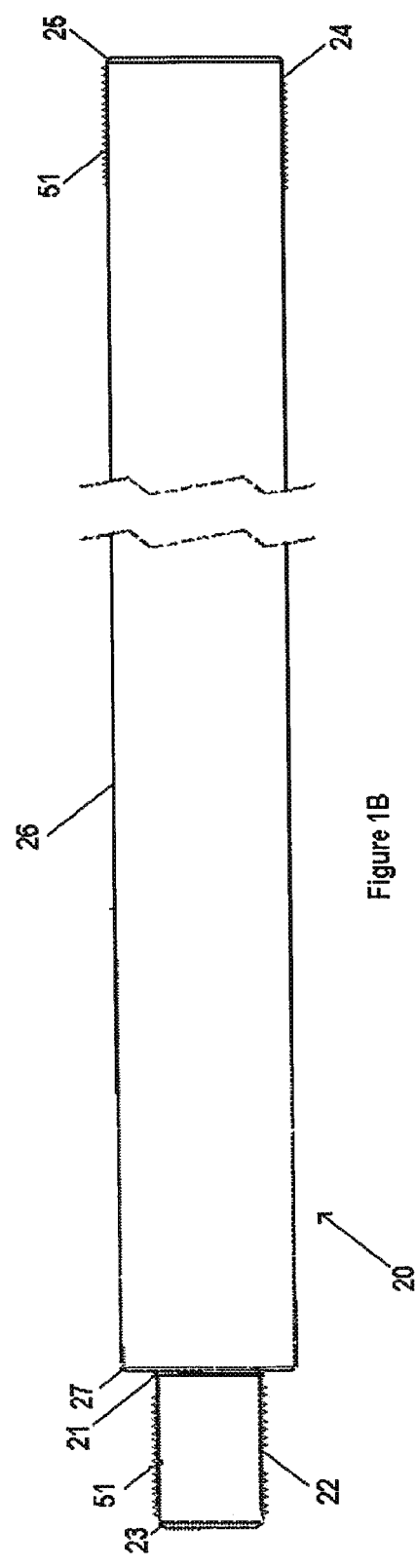

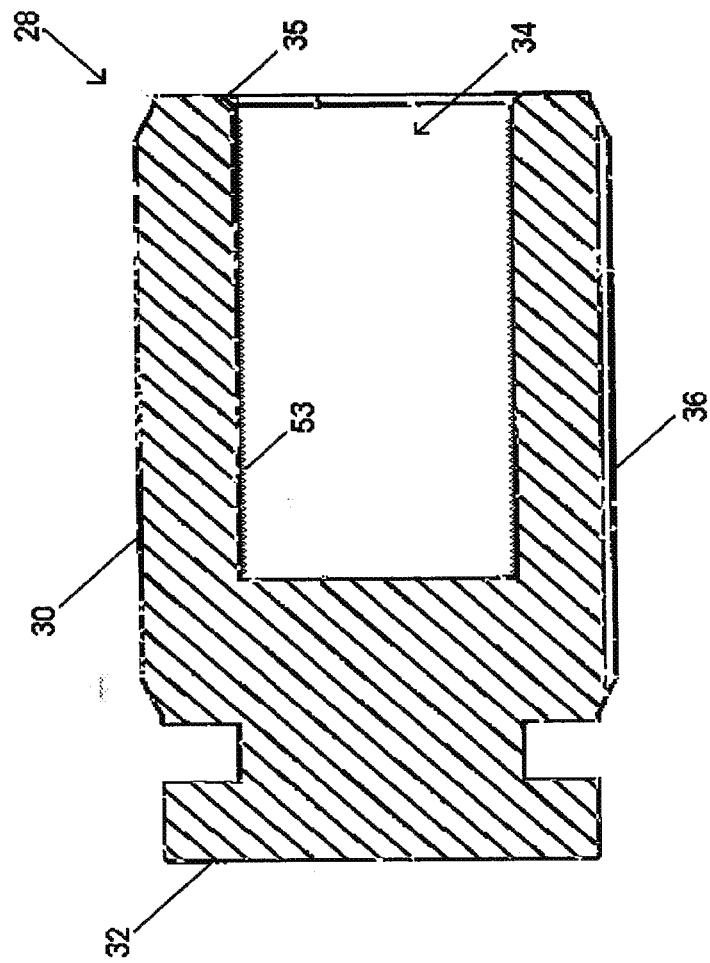
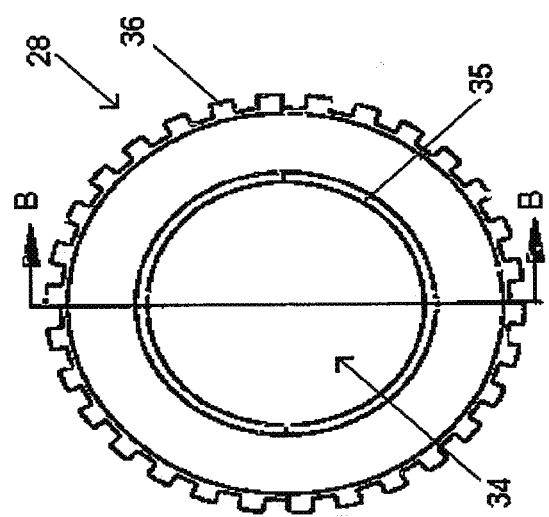
Figure 2B
Figure 2A

MODULAR AXLE SHAFT ASSEMBLIES FOR USE WITH RACING VEHICLES AND OTHER VEHICLES

PRIORITY

The present application is a divisional application of, and claims priority to, co-pending U.S. patent application Ser. No. 13/681,853, having the title of "Modular Axle Shaft Assemblies For Use With Racing Vehicles And Other Vehicles," filed Nov. 20, 2012, the entirety of which is incorporated herein by reference.

FIELD

Embodiments usable within the scope of the present disclosure relate, generally, to configurations for vehicle axles, and more specifically, to axle shaft assemblies usable with racing vehicles and other types of vehicles that can include combinations of materials selected to provide desired characteristics to the vehicle.

BACKGROUND

When designing racing vehicles, a key factor that plays a significant role in the performance of a vehicle is its weight. Decreasing the weight of a racing vehicle, even by a small amount, can result in improved acceleration and a greater overall top speed. One portion of racing vehicles that is often targeted for use of lighter components is the axles thereof, primarily due to the fact that conventional axles are formed from heavy, steel, tubular members.

For example, a typical rear axle of a racing vehicle (e.g., a drive axle) will include one or multiple steel tubulars, having varying points of thickness along their length, for providing desirable suspension characteristics and impact resistance. A hub is positioned at the outer edge of each tubular, to which a wheel is secured, while some manner of engagement with the drive system (e.g., gears, splines, etc.) are formed on the inner ends of each tubular. It is possible for an entire axle assembly (e.g., the hub, shaft, and a splined connector) to be machined from a single piece of steel, though it is also possible to weld or otherwise connect separate hub and connector components to a shaft.

In addition to the disadvantages inherent in their weight, steel components can be readily damaged and/or deformed, especially if subjected to a significant side impact. Due to its generally high modulus of elasticity, a steel axle that is bent through an impact will remain warped, requiring replacement.

To attempt to address the drawbacks of conventional steel materials, use of alternate materials has been explored, including various plastics and composites, as well as alternate metals. For example, use of an axle shaft assembly formed wholly from titanium has been attempted; however, due to the fact that titanium parts cannot be readily welded and/or attached to adjacent parts, such an assembly is expensive to produce, requiring the machining of a single piece of titanium that is large enough to form both an integral hub and shaft. Additionally, while an axle assembly formed wholly from titanium is lighter and more flexible than steel counterparts, titanium splines are prone to breakage and rapid wear, even when provided with wear resistant coatings and surface treatments. Further, titanium hub connections are significantly more complex and expensive than typical steel counterparts.

A need exists for axle shaft assemblies and methods that combine materials having low and high moduli of elasticity to provide desirable weight, suspension, impact resistance, and durability characteristics to a vehicle, while enabling a higher fatigue life.

A need also exists for axle shaft assemblies and methods that incorporate modular components.

Embodiments usable within the scope of the present disclosure meet these needs.

SUMMARY

Embodiments usable within the scope of the present disclosure include an axle shaft assembly for a vehicle. While embodiments are described herein with specific reference to racing vehicles and rear axles thereof, it should be understood that the disclosed axle shaft assemblies can be used in place of any conventional axle and/or shaft, including front axles, rear axles, engine axles, or any other elongate portion of a vehicle intended to transmit or receive torque.

Specifically, an axle shaft assembly can include a first shaft having a first end, a second end, and a central portion, the first shaft being formed from a material having a modulus of elasticity adapted to provide the first shaft with a flexibility for withstanding a side impact and resisting deformation. It should be understood that the term "shaft" as used herein, can include a solid shaft or a hollow and/or tubular shaft, depending on the desired structural characteristics of the axle. For example, a solid shaft can be used when the desired weight and suspension characteristics warrant such, while a shaft could be provided with a bore to reduce the overall weight of the axle in other embodiments. In a preferred embodiment, the shaft can be formed from titanium. Titanium provides a high strength, flexible axle shaft that resists deformation, and is lighter than conventional steel components, enabling more rapid acceleration and a faster overall speed. Due to its flexibility and strength, titanium also provides a higher fatigue life. Additionally, a titanium shaft can be formed as a generally straight member (e.g., having a continuous outer diameter) while providing sufficient strength, thus avoiding the time and cost required to provide conventional steel shafts with shoulders and/or tapered regions.

A first end member can be engaged with the first end of the shaft, and a second end member can be engaged with the second end. The end members can be formed from a second material having a modulus of elasticity greater than that of the shaft. For example, in a preferred embodiment, the end members can be formed from steel. In a further embodiment, the two end members can be formed from differing materials (e.g., differing grades/hardnesses of steel, or different metals, alloys, polymers, composites, etc.).

Specifically, in one possible embodiment, the first end member can include a splined member adapted to receive rotational force from a drive system and transfer the rotational force to the shaft. The second end member can include a hub flange adapted for attachment to a wheel, such that rotation applied by the drive system to the splined member is transferred to and rotates the wheel, via the shaft and hub flange. As such, a first shaft, splined connector, and hub flange can function as one half of a drive axle, used to rotate a wheel, while a second shaft, splined connector, and hub flange of similar configuration can be oriented in the opposing direction, such that the second splined connector can simultaneously receive rotational force from the drive system. Use of steel or similar hard/durable materials to form splined connectors and hub flanges can provide the overall axle shaft assembly with sufficient durability to withstand rotational forces without damaging the splines or similar members. In other possible embodiments, each end member can include a splined connector, e.g., for receiving and/or transferring force to and/or from objects engaged at both ends of the shaft.

Due to the difficulties inherent in welding and/or otherwise attaching titanium components to steel components, and connecting low and high modulus components in general, in an embodiment, the first and/or second end members can be integrally and mechanically connected to the shaft using one or more mechanical connectors. For example, titanium and steel components could be threaded together, using precisely designed threads that provide a secure connection while preventing undesirable stresses on the components and the threads thereof (e.g., by withstanding shock loads and preventing fatigue in the materials).

Use of such configurations allows the embodied axle shaft assemblies to be modular, such that end members and shafts can be interchanged and replaced, as needed, rapidly and efficiently (e.g., during a racing event).

BRIEF DESCRIPTION OF THE DRAWINGS

In the detailed description of various embodiments usable within the scope of the present disclosure, presented below, reference is made to the accompanying drawings, in which:

FIG. 1A depicts a diagrammatic side view of an embodiment of a shaft usable within the scope of the present disclosure.

FIG. 1B depicts a diagrammatic side view of an alternate embodiment of a shaft usable within the scope of the present disclosure.

FIG. 2A depicts an end view of an embodiment of an end member usable within the scope of the present disclosure.

FIG. 2B depicts a side, cross-sectional view of the end member of FIG. 2A, taken along line B of FIG. 2A.

Figure 3B:
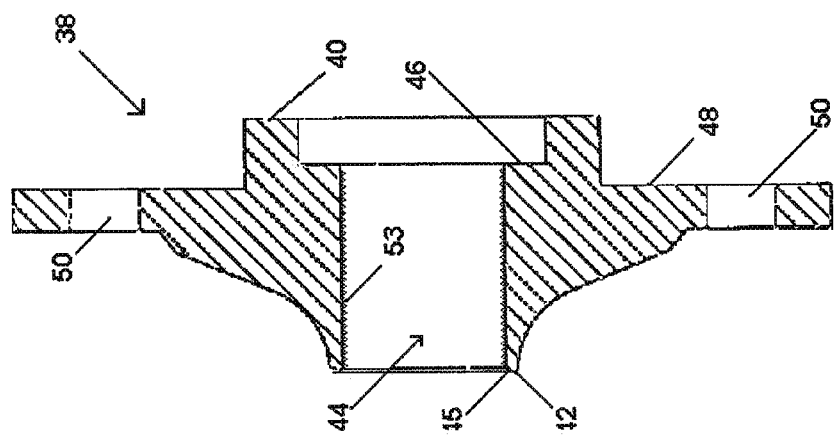
FIG. 3B depicts a side, cross-sectional view of the end member of FIG. 3A, taken along line B of FIG. 3A.

One or more embodiments are described below with reference to the listed Figures.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," "above," "below," and so forth are made only with respect to explanation in conjunction with the drawings, and that the components may be oriented differently, for instance, during transportation and manufacturing as well as operation. Because many varying and different embodiments may be made within the scope of the concepts herein taught, and because many modifications may be made in the embodiments described herein, it is to be understood that the details herein are to be interpreted as illustrative and non-limiting.

As described above, embodiments usable within the scope of the present disclosure relate to axle shaft assemblies, systems, and methods that include use of a shaft (e.g., a titanium shaft having a generally constant outer diameter) that can be mechanically and/or integrally connected to end members (e.g., splined connectors and/or hub flanges), such as through use of threads or other mechanical connections. Use of a shaft formed from lightweight materials having a low modulus of elasticity (e.g., titanium) reduces the overall weight of the axle assembly while providing a high strength, flexible axle shaft able to withstand side impacts without deformation while providing favorable suspension characteristics to the vehicle. Use of end members formed from alternate materials (e.g., steel) enables portions of the axle shaft subjected to rotational/torque forces (e.g., splines and hubs) to withstand such stresses. Such axle shaft assemblies, systems, and methods, while especially useful as rear (e.g., driving) axles of racing vehicles, are usable with any type of vehicle, and with any type of axle (e.g., front/steering axles, engine axles, or any other elongate portion of a vehicle designed to receive and/or transmit torque).

Referring now to FIG. 1A, an embodiment of a shaft (10) usable within the scope of the present disclosure is shown. The shaft (10) includes a first end (12) and a second end (14) terminating at tapered/beveled shoulders (13, 15, respectively). The central portion of the depicted embodiment of the shaft (10) includes a tapered portion (17), which extends between a thicker region (16) proximate to the second end (14), and a thinner region (18) proximate to the first end (12). The thinner region (18) is shown having a diameter greater than that of the first end (12), such that a shoulder (19) (e.g., a tapered/beveled shoulder) is defined between the first end (12) and the thinner region (18). An additional taper/bevel (11) is shown at the meeting point between the first end (12) and the thinner region (18). Exterior threads (51) are shown at each end (12, 14) of the shaft (10), the threads (51) being one example of a mechanical connection between the shaft (10) and adjacent components.

While shafts usable within the scope of the present disclosure can include any shape, dimensions, and/or materials, and can have any desired wall thickness (including being substantially solid, if desired), depending on the characteristics of the vehicle with which the shaft is used, the purpose for which the vehicle and/or shaft is used, and other similar factors, the depicted shaft (10) is formed from titanium, having a total length of about 33.0 inches. The first end (12) is shown having a length of about 1.450 inches and a diameter of about 0.750 inches. The thinner region (18) is shown having a length of about 3.850 inches and a diameter of about 1.27 inches. The thicker region (16) is shown having a length of about 28.7 inches (inclusive of the tapered portion (17)), and a diameter of about 1.43 inches. Each tapered/beveled shoulder (13, 15, 19) is shown having a taper of approximately 45 degrees, save for the additional taper/bevel (11) between the first end (12) and thinner region (18), which is shown having a taper of approximately 30 degrees. The tapered portion (17) is shown extending at an angle of approximately 15 degrees.

Referring now to FIG. 1B, an alternate embodiment of a shaft (20) usable within the scope of the present disclosure is shown. The depicted shaft (20) differs from the shaft shown in FIG. 1A in that the depicted shaft (20) includes a generally continuous diameter. Specifically, the shaft (20) includes a first end (22) having a tapered/beveled distal edge (23), and a second end (24) having a tapered/beveled edge (25). The entirety of the central portion (26) of the shaft (20), extending from the second end (24) to a tapered/beveled shoulder (27), where the central portion (26) meets the first end (22), is shown having a constant diameter. An additional taper/bevel (21) is shown at the meeting point between the first end (22) and the central portion (26). Threads (51) are shown at each end (22, 24) of the shaft (20), identical and/or similar to the threads shown with regard to the shaft of FIG. 1A. As described previously, use of high strength, flexible materials, such as titanium, enables the use of a generally straight shaft, thus avoiding the time and cost required to provide conventional steel shafts with shoulders and/or tapered regions.

The depicted shaft (20) is shown having substantially similar dimensions to those of the shaft of FIG. 1A. Specifically, the depicted embodiment is formed from titanium, having a total length of about 33.0 inches. The first end (22) is shown having a length of about 1.450 inches and a diameter of about 0.750 inches. The central portion (26) is shown having a length of about 31.550 inches and a diameter of about 1.43 inches. Each tapered/beveled shoulder (23, 25, 27) is shown having a taper of approximately 45 degrees, save for the additional taper/bevel (21) between the first end (22) and central portion (26), which is shown having a taper of approximately 30 degrees.

Referring now to FIGS. 2A and 2B, an embodiment of an end member (28) usable within the scope of the present disclosure is shown. Specifically, FIG. 2A depicts an end view of the end member (28), while FIG. 2B depicts a side, cross-sectional view thereof, taken along line B of FIG. 2A. While FIGS. 2A and 2B depict the end member (28) as a splined connector, engageable with an end of the shaft (10, 20, shown in FIGS. 1A and 1B, respectively) to receive torque from, e.g., a drive system, and transfer the torque to the shaft (e.g., via a mechanical connection therebetween), it should be understood that the depicted splined connector is only one exemplary type of end connector usable within the scope of the present disclosure.

The end member (28) is shown having a generally cylindrical body (30) enclosing a bore (34) extending partially along the length thereof, and an end portion (32) extending from the body (30). A plurality of elongate splines (36) are shown formed on and/or otherwise extending from the body (30). In use, complementary splines, teeth, and/or other types of protruding members, e.g., from a drive system, can engage the spines and apply a rotational force thereto, e.g., via entry into the spaces defined between adjacent splines and application of a lateral force to one or more splines. Interior threads (53) are shown as one example of a mechanical connection usable to secure the end member (28) to adjacent components (e.g., a shaft, such as that shown in FIG. 1A or 1B).

While end members usable within the scope of the present disclosure can include any shape, dimensions, and/or materials, and can have any configuration necessary to adapt the axle shaft assembly to serve a desired purpose (e.g., to receive/transfer motive force), the depicted end member (28) is shown as a splined connector formed from steel and having an overall length of about 2.372 inches, and a diameter of about 1.72 inches. The bore (34) is shown having a diameter of about 0.745 inches and a depth of about 1.500 inches, terminating at a 45 degree taper (35) at the outer edge thereof.

Figure 3A:
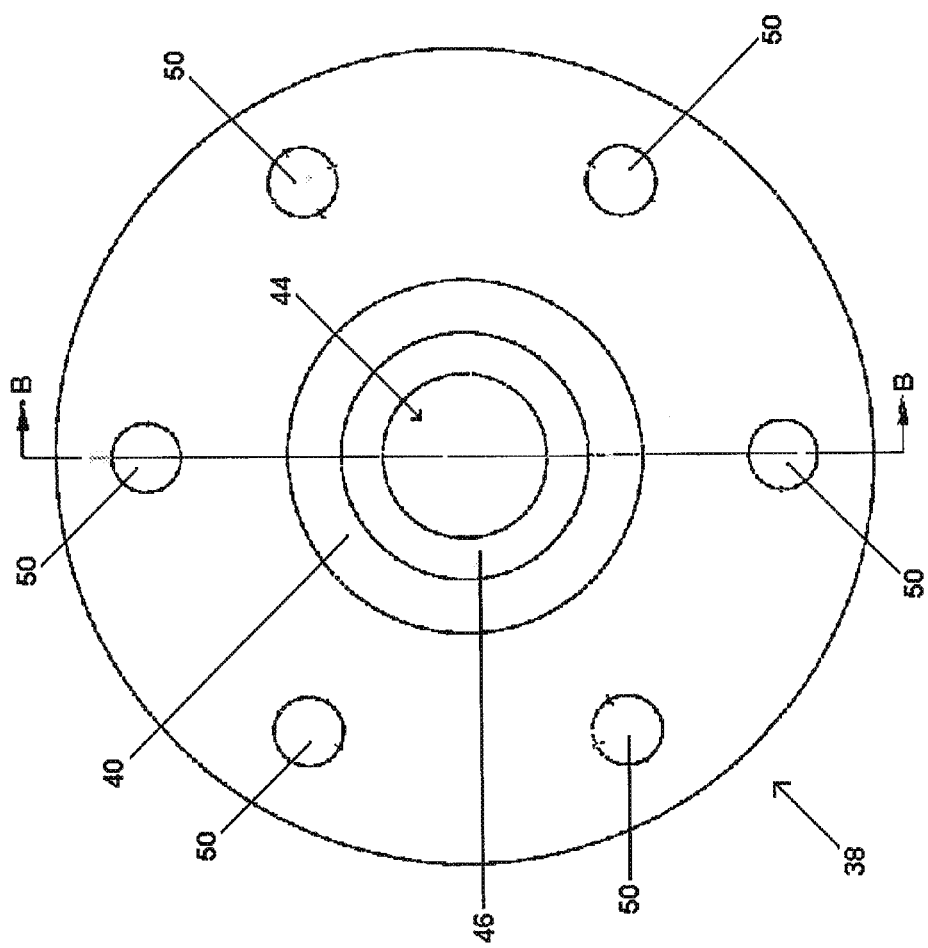
FIG. 3A depicts an end view of an embodiment of an end member usable within the scope of the present disclosure.

Referring now to FIGS. 3A and 3B, another embodiment of an end member (38) usable within the scope of the present disclosure is shown. Specifically, FIG. 3A depicts an end view of the end member (38), while FIG. 3B depicts a side, cross-sectional view thereof, taken along line B of FIG. 3A. While FIGS. 3A and 3B depict the end member (38) as a hub flange, engageable with an end of the shaft (10, 20, shown in FIGS. 1A and 1B, respectively), and with a wheel, such that torque received from the shaft can be used to rotate the wheel, it should be understood that the depicted hub flange is only one exemplary type of end connector usable within the scope of the present disclosure.

The end connector (38) is shown having a front and/or outer surface (40), and a rear and/or inner surface (42), with an axial bore (44) extending through the approximate center thereof between the outer and inner surfaces (40, 42). An interior shoulder or step defines an intermediate surface (46) such that an outer portion of the bore (44) is wider than the remainder thereof. A front face (48) of the end member (38) includes a plurality of orifices (50) for accommodating bolts and/or other similar fasteners, usable, for example, to secure a wheel or other object thereto. In use, the bore (44) can accommodate an end portion of a shaft (e.g., shaft (10) or (20) shown in FIGS. 1A and 2B, respectively), such as through use of a mechanical connection therebetween, enabling force received by the shaft to be transferred, via the end member (38) to an attached wheel or other object. Internal threads (53) similar and/or identical to those shown in FIG. 2B, are shown as one example of a mechanical connection usable to secure the end member (38) to adjacent components (e.g., a shaft, such as that shown in FIG. 1A or 1B).

While end members usable within the scope of the present disclosure can include any shape, dimensions, and/or materials, and can have any configuration necessary to adapt the axle shaft assembly to serve a desired purpose (e.g., to receive/transfer motive force), the depicted end member (38) is shown as a hub flange formed from steel having an overall width of about 2.191 inches. The intermediate surface (46) is shown recessed approximately 0.433 inches from the front surface (40), while the inner edge of the bore (44) terminates at a 45-degree taper (45). The diameter of the depicted hub flange and the shape and dimensions of the orifices (50) can vary depending on the type of wheel to be engaged therewith.

Figures 4A, 4B:
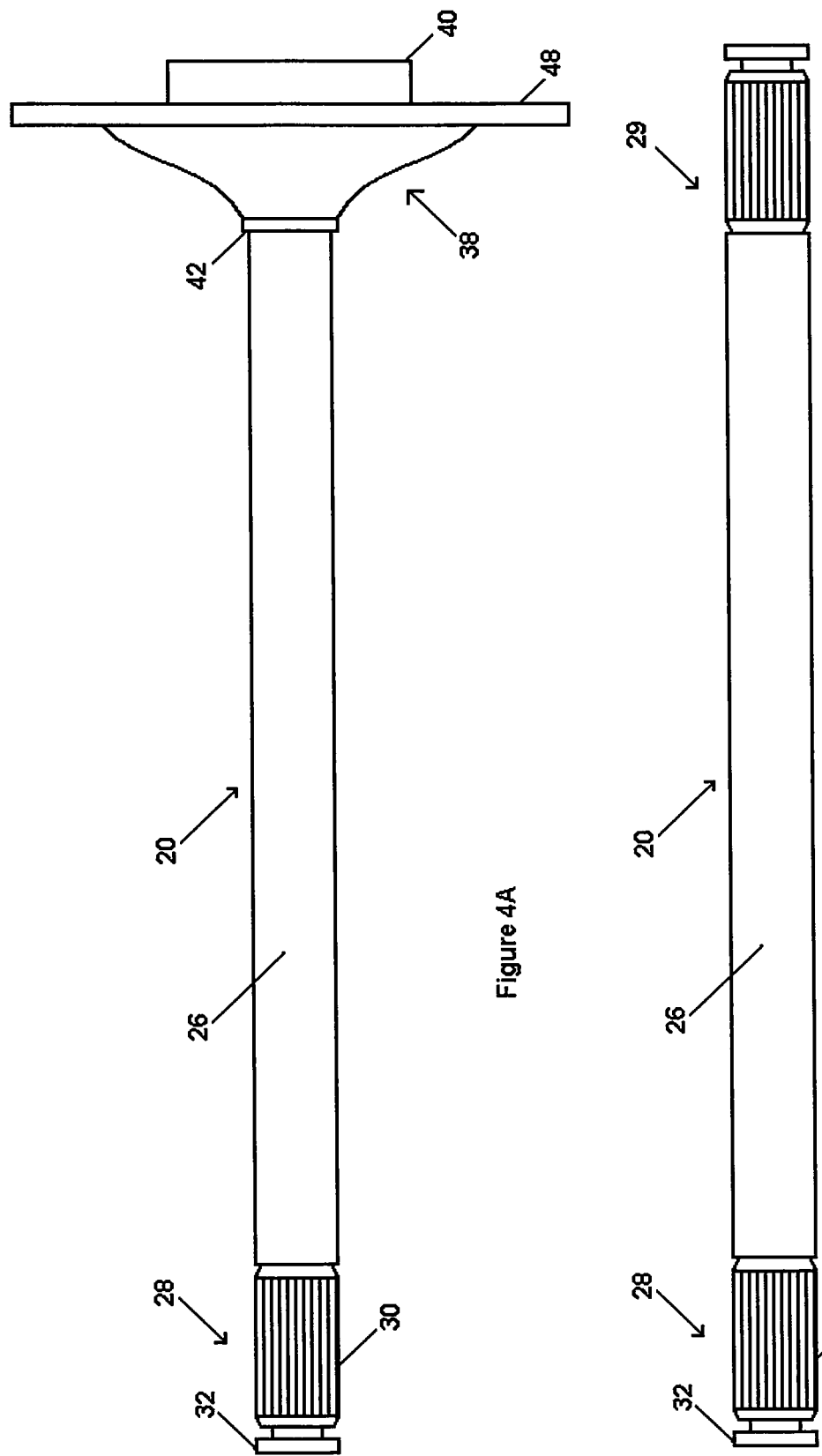
FIG. 4A depicts a diagrammatic side view of an embodiment of an axle shaft assembly usable within the scope of the present disclosure.
FIG. 4B depicts a diagrammatic side view of an alternate embodiment of an axle shaft assembly usable within the scope of the present disclosure.

Referring now to FIG. 4A, a diagrammatic side view of an embodiment of an axle shaft assembly usable within the scope of the present disclosure is shown. The shaft (20) is shown having a generally straight body (26) (e.g., a cylindrical body of generally constant diameter throughout its length), having the first end member (28), a splined connector, mechanically and integrally engaged with a first end thereof, and a second end member (38), a hub flange, mechanically and integrally engaged with a second end thereof. As described above, engagement between the end members (28, 38) and respective ends of the shaft (20) can be accomplished by inserting an end of the shaft (e.g., ends (22) and (24), shown in FIG. 1B) into corresponding bores of the end members (28, 38) (e.g., bores (34) and (44), shown in FIGS. 2B and 3B, respectively), where various mechanical means of engagement, as described previously, can be used to secure the shaft (20) within the end members (28, 38). Engagement between the shaft (20) and end members (28, 38) can be reversible, such that end members and shafts can be interchangeably removed as desired in a modular fashion, enabling rapid and efficient reconfiguration of the axle shaft assembly.

FIG. 4B depicts an alternate embodiment of the axle shaft assembly in which the shaft (20) is shown engaged to substantially identical end members (28, 29), depicted as splined connectors. Such an embodiment is usable with types of axles intended to receive torque/rotational force from a first component engaged to a first splined connector at one end thereof, and to transfer the rotational force, via the second splined connector at the opposing end, to a second component.

Embodiments usable within the scope of the present disclosure thereby provide axle shaft assemblies and methods that combine materials having low and high moduli of elasticity to provide desirable weight, suspension, impact resistance, and durability characteristics to a vehicle, while enabling interchangeability and modular reconfiguration of components, as desired.

While various embodiments usable within the scope of the present disclosure have been described with emphasis, it should be understood that within the scope of the appended claims, the present invention can be practiced other than as specifically described herein.

What is claimed is:

1. An axle shaft assembly for a vehicle, the assembly comprising:
   a first shaft having a first end, a second end, and a central portion, wherein the first shaft is formed from a first material having a first flexibility for adapting the first shaft to withstand side impacts and resist deformation;
   an end member integrally and mechanically engaged with the first end of the first shaft, wherein the end member is formed from a second material having a second flexibility less than the first flexibility, and wherein the end member is adapted to withstand a first rotational force from a drive system and transfer the first rotational force to the first shaft; and
   a hub flange integrally and mechanically engaged with the second end of the first shaft, wherein the hub flange is formed from the second material, and wherein the hub flange is adapted to withstand the first rotational force transferred from the first shaft.

2. The axle shaft assembly of claim 1, wherein the first material comprises titanium.

3. The axle shaft assembly of claim 2, wherein the second material comprises steel.

4. The axle shaft assembly of claim 1, wherein the end member is splined.

5. The axle shaft assembly of claim 1, wherein the hub flange is adapted for attachment to the wheel, and wherein the first shaft transfers the first rotational force to the hub flange.

6. The axle shaft assembly of claim 1, wherein the first shaft comprises a constant outer diameter between the first end and the second end.

7. The axle shaft assembly of claim 1, further comprising:
   a second shaft having a third end, a fourth end, and a central portion, wherein the second shaft is formed from the first material;
   a second end member engaged with the third end of the second shaft, wherein the second end member is formed from the second material, and wherein the second end member is adapted to receive the first rotational force from the drive system and transfer the first rotational force to the second shaft; and
   a second hub flange engaged with the fourth end of the second shaft, wherein the second hub flange is formed from the second material, and wherein the second shaft transfers the first rotational force to the second hub flange.

8. An axle shaft assembly for a racing vehicle, the axle shaft assembly comprising:
   a first shaft having a first end and a second end, wherein the first shaft is formed from a first material having a first flexibility adapted to withstand a side impact and resist deformation;
   a first splined member integrally and mechanically connected to the first end, wherein the first splined member is formed from a second material having a second flexibility less than the first flexibility and adapted to withstand rotational force;
   a first hub flange integrally and mechanically connected to the second end, wherein the first hub flange is formed from the second material, a third material having a third flexibility less than the first flexibility, or combinations thereof;
   a second shaft having a third end and a fourth end, wherein the second shaft is formed from the first material;
   a second splined member integrally and mechanically connected to the third end, wherein the second splined member is formed from the second material, the third material, a fourth material having a fourth flexibility less than the first flexibility, or combinations thereof; and
   a second hub flange integrally and mechanically connected to the fourth end, wherein the second hub flange is formed from the second material, the third material, the fourth material, a fifth material having a fifth flexibility less than the first flexibility, or combinations thereof,
   wherein the first splined member receives a rotational force from a drive system and transfers the rotational force to the first shaft, wherein the first shaft transfers the rotational force to the first hub flange for rotating a first wheel attached thereto, wherein the second splined member receives the rotational force from the drive system and transfers the rotational force to the second shaft, and wherein the second shaft transfers the rotational force to the second hub flange for rotating a second wheel attached thereto.

9. The axle shaft assembly of claim 8, wherein the first material comprises titanium.

10. The axle shaft assembly of claim 9, wherein the second material comprises steel.

11. The axle shaft assembly of claim 8, wherein the first shaft comprises a constant outer diameter between the first end and the second end.

12. The axle shaft assembly of claim 8, wherein the second shaft comprises a constant outer diameter between the third end and the fourth end.

13. A method for providing a vehicle with an axle shaft, the method comprising the steps of:
- engaging a first end member with a first end of a first shaft, wherein the first shaft is formed from a first material having a first flexibility and the first shaft is adapted to withstand a side impact and resist deformation, wherein the first end member is formed from a second material having a second flexibility less than the first flexibility, and wherein the first end member is adapted to withstand a first rotational force;
- engaging a first hub flange with a second end of the first shaft, wherein the first hub flange is formed from the second material, and wherein the first hub flange is adapted to withstand the first rotational force, a second rotational force, or combinations thereof; and
- applying a rotational force to the first end member, thereby rotating the first shaft and the first hub flange.

14. The method of claim 13, wherein the first hub flange is adapted for attachment to a wheel, and wherein the step of applying the rotational force to the first end member comprises transferring the rotational force from the drive system to the first shaft and from the first shaft to the wheel.

15. The method of claim 13, further comprising the steps of:
- engaging a second end member with a third end of a second shaft, wherein the second shaft is formed from the first material and the second end member is formed from the second material; and
- engaging a second hub flange with a fourth end of the second shaft, wherein the second hub flange is formed from the second material, wherein the step of applying the rotational force to the first end member further comprises applying the rotational force to the second end member, thereby rotating the second shaft and the second hub flange.

16. The method of claim 13, wherein the first material comprises titanium.

17. The method of claim 16, wherein the second material comprises steel.

* * * * *